T. REYNOLDS.
TRAIN PIPE COUPLING.
APPLICATION FILED MAR. 24, 1910.
971,147.
Patented Sept. 27, 1910.
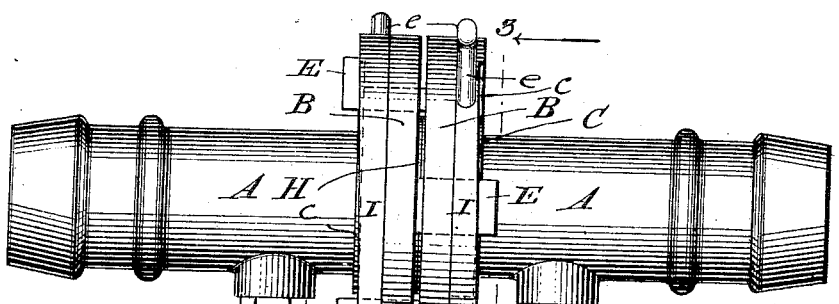
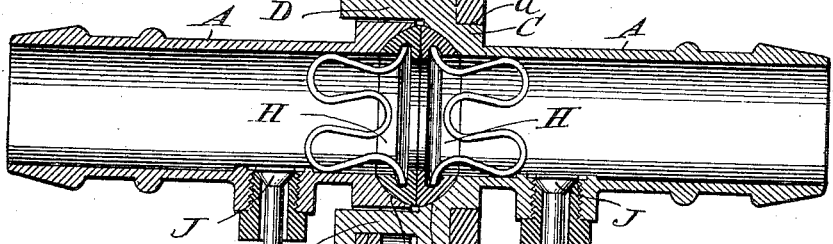
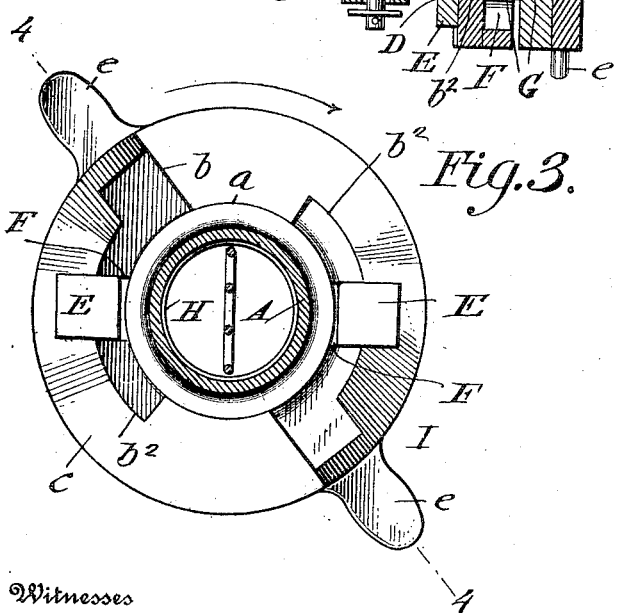
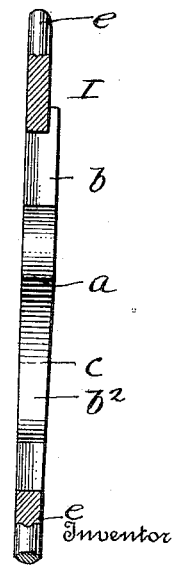

UNITED STATES PATENT OFFICE.

THOMAS REYNOLDS, OF BARABOO, WISCONSIN.

TRAIN-PIPE COUPLING.

971,147.  Specification of Letters Patent.  Patented Sept. 27, 1910.

Application filed March 24, 1910. Serial No. 551,357.

*To all whom it may concern:*

Be it known that I, THOMAS REYNOLDS, citizen of the United States, residing at Baraboo, in the county of Sauk and State of Wisconsin, have invented new and useful Improvements in Train-Pipe Couplings, of which the following is a specification.

My invention has to do with train-pipe couplings of the hand-operated type; and it has for its object to provide a simple and practical coupling of the kind stated, embodying such a construction that a direct and safe coupling may be quickly and easily made, thus obviating the necessity of providing slack hose between cars, and one that is well adapted to withstand the rough usage to which train-pipe couplings are ordinarily subjected, and is calculated to preclude leakage of steam or other fluid under pressure at the joint.

The invention will be best understood by reference to the following description when taken in connection with the accompanying illustration of one specific embodiment thereof, while its scope will be more particularly pointed out in the appended claim.

In the drawings which constitute part hereof: Figure 1 is a side elevation showing the members of my novel coupling as properly connected together. Fig. 2 is a longitudinal central section of the same. Fig. 3 is a transverse section taken in the plane indicated by the line 3—3 of Fig. 1, looking toward the left. Fig. 4 is a diametrical section taken through one of the cam disks of the couplings in the plane indicated by the line 4—4 of Fig. 3.

Similar letters of reference designate corresponding parts in all of the views of the drawings.

Each of the two members comprised in my novel coupling, has a nipple A for the connection of hose, and a head B at the inner end of the nipple, and it will also be noted by comparison of Figs. 1 to 3 that the head B is provided with a circular shoulder C at its rear side, while from the forward side of the head two diametrically opposite arms D reach forward, which arms are provided at their forward ends with angularly disposed outwardly extending projections E. It will further be noted by reference to Fig. 2 that each head B is provided with two longitudinally disposed openings F located diametrically opposite each other. For the sake of clearness I would have it understood at this point that the openings F of the member at the left of Fig. 2 are designed for the longitudinal passage of the projections E on the arms D of the member at the right of said figure, and that the openings F in the head B of the member at the right of Fig. 2 are so located that said openings F will, when the members are opposed, rest midway between the openings F of the member at the left so as to properly receive the correspondingly located arms D and projections E of said member at the left of Fig. 2. Interiorly each of the coupling members is provided with a seat G to receive one section H of a gasket of the "Gold" type, which sections H are designed when the coupling is effected to be held under pressure against each other with a view of rendering the coupling steam tight.

In addition to the body including the nipple A and the head B, each member of my novel coupling comprises a rotary cam disk I of annular form. The said cam disks I are identical in construction, and therefore a specific description of the one shown in Figs. 3 and 4 will suffice to impart a definite understanding of both. The cam disk I referred to is provided with a central circular opening $a$ to receive the shoulder C of its respective body, and is arranged to rest and to turn against the rear side of the head on said body. It will also be understood that the disk I is provided in its inner edge with diametrically opposite longitudinally disposed openings $b$ for the longitudinal passage of the projections E on the opposed coupling member, and is further provided with slots $b^2$ which extend circularly in opposite directions from their respective openings $b$, and with circularly disposed cams $c$ which also extend in opposite directions from their respective openings $b$ and are inclined or increased in thickness as they recede from the openings $b$.

I prefer to provide the nipple A of each of the coupling members with an outwardly seating valve J, but this latter may be of any desired construction or may be altogether omitted without affecting my invention, and I therefore deem it unnecessary to further refer to the same.

In the practical use of my invention, the coupling is made by bringing the members together after the manner shown in Fig. 2, and then turning either one or both of the disks I through the medium of the handle e thereof. When one or both of the disks I are turned as stated, the heads B will be drawn toward each other by reason of the co-operation of the cams c with the projections E, and in consequence the sections of the "Gold" gasket will be crowded or held under pressure against each other and leakage of steam or other fluid under pressure will be precluded. It will also be noted here that while the coupling made is a direct one and is brought about quickly and with but little effort, there is no liability of the members becoming casually disconnected or loose during the use of the coupling. By reason of the annular cam disks I being provided with the openings $b$ and the circular slots $b^2$ in their inner edges, it will be observed that when the coupling is effected, the arms D are surrounded by the cam disks and are confined between the outer walls of the slots $b^2$ and the shoulders C of the nipples, with the result that the said arms D are reinforced and protected by the disks. To disconnect the members of the coupling, it is simply necessary to turn the cam disks I in reverse direction until their openings $b$ register with the projections E, whereupon the members may be rectilinearly separated.

While I have shown and described one form of my invention, it is to be understood that I am not limited to the details or the form or relative arrangement of parts disclosed, but that modifications may be made therein without departing from the spirit thereof.

Having described my invention, what I claim and desire to secure by Letters-Patent, is:

In a train-pipe coupling, the combination of opposed members, each comprising a body having a nipple and a head at the outer end thereof and also having a circular shoulder back of the head and diametrically opposite openings in said head and diametrically opposite arms reaching forward from the head and terminating in angularly-disposed outwardly-extending projections, an annular revoluble disk mounted on the shoulder of the body back of the head and having in its inner edge diametrically-opposite radially disposed openings and slots which extend circularly in opposite directions from said openings, and also having between the closed ends of the slots and the adjacent radially disposed openings edge portions which bear on the circular shoulder of the body, and further having cams extending circularly in opposite directions from the openings, and means in the forward end of the body for coöperating with the other member to render the joint tight.

In testimony whereof I have hereunto set my hand in presence of two subscribing witnesses.

THOMAS REYNOLDS.

Witnesses:
 MAUD ELKINGTON,
 EVAN EVANS.